United States Patent [19]
Shatz

[11] Patent Number: 5,237,170
[45] Date of Patent: Aug. 17, 1993

[54] METHOD AND APPARATUS FOR NON-IMAGING CONCENTRATION AND PROJECTION OF ELECTROMAGNETIC RADIATION

[76] Inventor: Narkis E. I. Shatz, 6440 Drexel Ave., Los Angeles, Calif. 90048

[21] Appl. No.: 725,721

[22] Filed: Jul. 3, 1991

[51] Int. Cl.⁵ .................. H01J 3/14; H01J 5/16; H01J 40/14
[52] U.S. Cl. .................................. 250/216; 359/859
[58] Field of Search ............... 250/216; 359/859, 728

[56] References Cited

U.S. PATENT DOCUMENTS

| | | | |
|---|---|---|---|
| 3,805,052 | 4/1974 | Rambauske | 359/859 |
| 3,899,672 | 8/1975 | Levi-Setti | 359/869 |
| 3,923,381 | 12/1975 | Winston | 359/853 |
| 4,005,286 | 1/1977 | Faulkner | 250/216 |
| 4,270,844 | 6/1981 | Cobble et al. | 358/859 |
| 4,357,704 | 11/1982 | Koechner | 372/72 |
| 4,506,152 | 3/1985 | Gupta | 250/216 |
| 4,657,360 | 4/1987 | Izukawa | 359/859 |
| 4,792,685 | 12/1988 | Yamakawa | 359/859 |
| 4,815,858 | 3/1989 | Snaid | 359/858 |
| 4,816,694 | 3/1989 | Kuppenheimer et al. | 250/504 R |
| 5,016,995 | 5/1991 | Pullen | 359/859 |

Primary Examiner—Bruce C. Anderson

[57] ABSTRACT

A system for selectably concentrating and projecting electromagnetic radiation utilizes re-entrant reflecting surfaces and multiple internal reflections. The system of the present invention comprises components having a generally-shaped primary reflecting surface which may be used in conjunction with one or more generally-shaped secondary reflecting surfaces to achieve concentration of electromagnetic radiation along the direction of the projected beam for specified spatial radiation and collection patterns.

40 Claims, 8 Drawing Sheets

METHOD AND APPARATUS FOR NON-IMAGING CONCENTRATION AND PROJECTION OF ELECTROMAGNETIC RADIATION

TECHNICAL FIELD

The present invention relates to non-imaging electromagnetic radiation concentrating and projecting systems. More particularly, this invention is related to a device which applies new design principles in non-imaging optics to project a specified spatial electromagnetic radiation pattern from an extended radiating source and to achieve concentration of radiation onto an extended receiver.

BACKGROUND ART

Electromagnetic radiation, such as light, may be concentrated through an imaging optical system. The most familiar of such systems is a burning glass in which sunlight is focused onto a flammable surface, such as wood, by a magnifying glass. Curiously enough, elementary geometrical optics does not yield a theoretical limit on concentration for image-forming systems of this kind. According to the usual paraxial or Gaussian optics theory, when an object of linear dimension $\eta$ is imaged at size $\eta'$, the convergence angles are in the inverse ratio of these dimensions. FIG. 1A shows this relationship with media of different refractive indices in the source and absorber spaces. According to classical optics, the Lagrange invariant for this system is given by $$n\alpha\eta = n'\alpha'\eta'. \quad (1)$$

For a source at infinity, as in FIG. 1B, the Lagrange invariant takes the form $$-nh\beta = n'\alpha'\eta'. \quad (2)$$

If, in FIG. 1B, the concentration ratio is taken as the area of the lens divided by the area of the absorber, then $$\left(\frac{h}{\eta'}\right)^2 = \left(\frac{n'\alpha'}{n\beta}\right)^2, \quad (3)$$

and a similar expression holds for the case of FIG. 1A with the object at a finite distance. These expressions are based on paraxial optics, i.e., the small-angle approximation, and there is nothing in them which predicts what would happen if the angle $\alpha'$ is increased for the purpose of increasing concentration. From aberration theory, a lens must be corrected for spherical aberration and chromatic aberration on axis, and the Abbe sine condition also must be satisfied to form a good image of an extended object. Thus, the Abbe condition $$h = f \sin \alpha', \quad (4)$$

where f is the paraxial focal length, must be assured for all rays in the system of FIG. 1B.

It is well known to skilled optical designers that ordinary imaging systems with a finite field of view and good aberration correction have not been designed with the image side convergence angle ($\alpha'$) greater than about 60°. Therefore, the concentration is only about one half of what it could be if the convergence angle were 90°. Examples of systems having large convergence angles are microscope objectives and Abbe condensers. Another example of an imaging system which is less than ideal as a concentrator is the concave paraboloidal mirror which is often used for collecting solar energy. If the paraboloid is used with one infinite conjugate, a large negative coma is developed and spreads the light flux away from the axis, thus decreasing the concentration below that of an ideal, aberration-free system.

Imaging optical systems are fundamentally inefficient light concentrators because such systems impose constraints on the behavior of the ray pattern as described as follows:

An imaging optical system may be mathematically described in terms of a topological transformation ($\Gamma$) between the object space (X) and its image space ($\gamma$).

$$\gamma = \Gamma(X)$$

The fact that $\Gamma$ exists implies that for every point in X there exists only one point in $\gamma$. Furthermore, $\Gamma$ is required to observe the following necessary conditions.
(a) $\Gamma$ is a homeomorphism (i.e. it is a continuous transformation for which a continuous inverse exists). From this it follows that $\Gamma$ is also one-to-one.
(b) The image $\gamma$ is essentially aberration free and observes the Abbe Sine condition.

An imaging optical system applied to the problem of radiation concentration is constrained by the imaging requirements ((a) and (b) which mathematically impose restrictions on the permissible choices for the design degrees of freedom). These restrictions only permit a subset of systems which may therefore not be capable of achieving the best performance.

The Lagrange invariant can be regarded as a form of what is sometimes called the radiance theorem (radiance is power per unit projected area per unit solid angle integrated over an appropriate wavelength or frequency interval). In the prior art, the radiance theorem has been interpreted to imply that no optical system passing a single elemental beam can produce an image of a source with greater radiance than the source itself, apart from a factor involving the refractive indices in the source and output spaces.

The Lagrange theorem has also formed the basis for the development of the prior art concept of non-imaging optics. Since the object of such systems is to achieve concentration, whether for solar energy or for other applications, some of the requirements for image-forming systems can be relaxed. Light concentrating systems may contain elements other than ordinary lenses and mirrors (e.g., diffractive or holographic elements), can have aberrations, and need not even form an image at all. The only requirement is that as much as possible of the radiant flux entering one aperture emerges from another aperture of the system. Therefore, non-imaging concentrators are typically better at concentrating light than image-forming systems.

In analyzing imaging light concentrating systems, radiance of the source is considered in terms of elementary beams comprising elementary pencils of light subtending infinitesimal solid angles utilizing classical ray-tracing techniques. In all such cases the maximum achievable concentration ratio, i.e. the ratio of luminance perceived by a target to the luminance of the source, is less than one; in other words, the radiance at the target cannot exceed the radiance of the source. See Giles V. Klein, Wiley and Sons, Inc., "Optics", at pages 132-134, (1970). See also, for example, an analysis of an ordinary search light in Klein at pages 135-138.

A non-imaging light concentrating system may be described as similar to a funnel in which light entering the system over a large area is eventually directed to pass through a much smaller area. In the process, no image of the light source is formed. Non-imaging concentrators in the prior art can achieve a beam having an irradiance which is greater than the radiance of the source, by employing media having a ratio of refractive indices greater than one.

The limit of the concentration ratio of a non-imaging light concentrating system is determined by the second law of thermodynamics. In the prior art, the limit of the concentration obtainable in a non-imaging system may be estimated using the generalization of the Lagrange invariant for small displacements in position and direction of the incoming ray. Referring to FIG. 1C, an incoming ray is specified in two dimensions by dx, dy, dL and dM. There is a corresponding displacement of the emerging ray specified by primed symbols. Thus, the generalization of the Lagrange invariant asserts that $$n^2 dx\, dy\, dL\, dM = n'^2\, dx'dy'dL'dM'. \quad (5)$$

where L, M and L', M' are direction cosines defining the direction of ray segments in the entry and exit space coordinate systems.

If the system is lossless for the ray in question, this relation maintains that radiance is conserved or not increased along the ray. These limits agree with the predictions of thermodynamics. The statement "radiance is conserved along a ray" must be qualified to exclude certain devices such as dichroic or polarizing beam-combiners, since by combining beams of different frequencies or polarizations, radiance could be increased. However, typically in the prior art, beam-combiners are not used as components of non-imaging light concentrating systems.

When not restricted to small angles, the concentration ratio of a concentrator such as shown in FIG. 1D, having plane entry and exit apertures of areas A and A', respectively, where the entry aperture is filled with rays incident at all angles from 0 to $\theta$ degrees to the normal and all rays get through the concentrator to emerge from the exit aperture at, say, angles up to $\theta'$ to the normal, is given by $$C = \frac{A}{A'} = \frac{n'^2 \sin^2 \theta'}{n^2 \sin^2 \theta} \quad (6)$$

which is obtained by integrating both sides of Equation (5) over area and solid angle. The maximum possible concentration is obtained when the exit aperture is filled by rays up to $\pi/2$ to the normal, so the maximum possible concentration ratio is $$C_{max} = \frac{n'^2}{n^2 \sin^2 \theta}. \quad (7)$$

Equation (7) is the fundamental relationship of prior art non-imaging optics. It sets general limits on the expected design performance of prior art non-imaging light concentrating systems.

So-called two-dimensional (2D) systems form an important special case of such systems. All of the optical components of these systems are cylindrical having parallel generators, and the entry and exit apertures are parallel-sided slots. It then follows that if end effects are neglected or, as in practice, are canceled optically, the maximum possible concentration ratio is $$\frac{n'}{n \sin \theta}. \quad (8)$$

Equations (70 and (8), obtained by integrating the differential quantities on either side of Equation (5), which are also known as etendue and throughput, set limits to the designs of prior art concentrators. Typically, it has been possible to reach these limits by suitable designs of 2D non-imaging systems and to approach them asymptotically with three-dimensional, or 3D, systems. Concentrators which fulfill Equations (7) and (8) are called ideal concentrators in the prior art.

Historically, two-dimensional systems using mirrors, rather than refracting elements, were the first to be designed as theoretically perfect concentrators. Refracting elements have so far played more of an auxiliary role in non-imaging concentrators, primarily as convenient tools for making a system more compact or for facilitating the use of total internal reflection.

In the prior art, there are two accepted methods for designing nonimaging light concentrating systems. The first is called the edge-ray method. This design method results in trough-shaped concentrators for two-dimensional (2D) designs, and in cone-shaped concentrators for three-dimensional (3D) designs. For either case, the resulting shape is called a Compound Parabolic Concentrator (hereafter also CPC). FIG. 1D shows the CPC in section, comprising two concave reflectors 10 and 11, each a section of a parabola, but the two are not parts of the same parabola. Starting from the exit aperture A'B', the parabola AA' has its focus at B' and its axis at an angle $\theta$ to the concentrator axis, as shown. The other side is drawn similarly. The parabolas end at A and A', where their tangents are parallel to the concentrator axis.

With continuing reference to FIG. 1D, the concentration ratio of this system AB/A'B' is $1/\sin\theta$. All rays entering at angles up to $\theta$ get through the exit aperture and no rays at angles greater than $\theta$ get through. Thus, if the entry aperture is filled by rays up to the angle $\pm\theta$, the exit aperture must be filled by rays up to $\pm\pi/2$ in the plane of the diagram. According to the prior art, a plane absorber placed across the exit aperture would receive the maximum possible flux density that could be collected with the entry aperture AB. For a detailed description of the mode of operation of this system, see Winston R., Bassett, I. M., and Welford, W. T., "Non-imaging Optics for Flux Concentration", in Progress in Optics, Vol. 27, pages 161-226, 1989.

In such non-imaging systems, the radiation is supposedly coming from a Lambertian source at infinity subtending the angle $\pm\theta$, but no image is formed in the exit aperture space. Some rays go through the concentrator after one reflection, some after no reflections, and a sizeable proportion of the transmitted phase space volume is involved in two or more reflections. However, the multiply-reflected rays, to the extent they occur, are intentionally ignored in the design of prior art non-imaging systems. In an image-forming optical system, all the rays which form the image meet each reflecting or refracting surface the same number of times, usually only once, and in refracting systems at least there is generally a well-defined paraxial region in which the image formation is substantially perfect.

It can also be seen from ray traces that the rays which enter at angles less than $\theta$ follow a variety of paths to get through. The rays at the extreme angle $\pm\theta$ emerge just grazing the edge of the exit aperture. Thus, the extreme rays, i.e., rays at the maximum entry angle, should just get through an exit aperture of the right size for the planned concentration ratio. Thus, according to the so-called edge-ray principle, extreme rays at the entry aperture should also be extreme rays at the exit aperture. In its more general form, it applies also to sources at a finite distance.

It is important to note that the edge-ray design principle is used to design and implement light concentrating systems in which only rays that are reflected no more than once are considered. While this principle is a heuristic, it is considered helpful in designing both 2D and 3D systems. Referring again to the CPC of FIG. 1D, the extreme entry rays are those at $\pm\theta$ and the extreme exit rays are those emerging at A' and B'. All light rays entering the concentrator at the maximum design acceptance angle are directed, after one reflection at most, to the rim of the exit aperture. The remaining rays at intermediate angles are reflected within the exit aperture itself. Thus, an application of the principle yields the two parabolic profiles directly.

The second design technique is called the geometric-flux approach. (See Roland Winston, "Nonimaging Optics", Scientific American, pages 76-81, March, 1991.) In this approach, the aggregate of optical rays, i.e. elementary pencils, traverse an optical system in a way analogous to fluid flow. The rays traverse an abstract region called phase space; the space of ray positions and ray geometries. A quantity called geometric flux is constructed from the posited ray positions and directions. The concentrator is designed for a given application in a way that conserves the geometric flux or leaves it undisturbed.

In the example given by Winston to demonstrate the geometric-flux method, a flexible sheet of high-reflecting film is rolled to form a cone, shiny side in, so that a small aperture is left at the tip. The hole is positioned on a round object, such as a ball, and the sides of the cone are adjusted until the entire ball appears to be visible to the person looking through the large end, i.e. large aperture, of the cone. At this point the reflecting cone, i.e. concentrator, does not disturb the geometric vector flux associated with the ball. The lines of flow emanating from the ball are radial because of symmetry, and the cone simply follows those lines. As a consequence, the entire ball appears to be visible, even though all but a small part is hidden from direct view of the eye.

The cone reflects rays of light from the small patch of the ball associated with the small aperture so that the entire ball seems to come into view at the large aperture of the cone. In reverse, rays coming into the cone and heading toward the edge of the ball will be reflected to the small aperture. In other words, rays that would otherwise strike the surface of the ball pass instead through the hole and the light is concentrated.

In most applications, light is concentrated on a flat rather than a spherical surface. The flat surface solution is more complicated, but the basic principles are unchanged. Each flux flow line becomes a hyperbola, and hence the concentrator must be designed with hyperbolic walls. When such a concentrator is placed at the focus of a telescope or a solar furnace, for instance, the instrument appears to have a large target area for incoming light and once again the light is concentrated.

High concentrations of light attained with non-imaging systems are useful in a variety of fields, ranging from high energy physics to solar energy. Non-imaging concentrators collecting solar radiation have been experimentally demonstrated to exceed the radiance level of the sun by as much as fifteen percent (15%). See Cooke, D., Gleckman, P., Krebs, H., O'Gallagher, J., Sagie, D., and Winston R., "Sunlight Brighter than the Sun", Nature, Vol. 346, No. 6287, page 802, Aug. 30, 1990. A concentrator operating in reverse is a projector and can be used as an illumination system.

The prior art design techniques all result in designs which are essentially cone-like or which possess reflecting surface profiles which are close derivatives of parabolic functions. All of the aforementioned designs have common reflector geometries in which the aperture varies monotonically along the primary optical axis. Furthermore, fundamentally these designs intentionally ignore rays having more than a single reflection. Multiply-reflected rays will occur to some extent in the operation of such systems, those rays have not been accounted for in the design of those systems.

Existing designs of light concentrating systems are relatively bulky because they require a relatively large ratio of length to diameter. In addition, in order to exceed the radiance level of the source at the target, light concentrating systems in the prior art must employ optical media having a refractive index greater than one which tends to make them heavy, bulky and expensive. Moreover, the designs of the prior art only perform well for disc-like sources of illumination; consequently, their applicability to a generalized sources or receiver shapes is limited and their performance is severely degraded.

DISCLOSURE OF INVENTION

A reversible electromagnetic radiation concentrating system constructed according to the present invention utilizes multiple internal reflections and reentrant geometries to provide very high electromagnetic radiation concentration ratios. The present invention provides a method for designing a class of compact non-imaging reflective components for concentrating or projecting electromagnetic radiation comprising a generally-shaped, primary reflecting surface which may be used in conjunction with one or more generally-shaped, secondary reflecting surfaces.

The designs of the present invention achieve a very high concentration ratio along the direction of the projected beam without requiring the use of refractive devices. These designs may also be used to achieve a specified spatial radiation pattern, and to collect radiation and distribute it in a specified spatial pattern onto a receiver.

These designs can be customized for use with any extended radiating source or extended radiation receiver geometries. Whenever the source or receiver are extended, the collection and concentration efficiency of the present invention exceeds that of all known designs, both imaging and nonimaging.

Since the principles of the present invention can be utilized for any extended source or extended receiver geometry, the invention is applicable to optical condenser systems, search lights, beacons, optical countermeasures, high-energy radiation weapons, laser-pump illuminators, fiber optics and antennas. Concentrating radiation onto an arbitrarily shaped extended receiver is applicable in solar energy concentrators and infra-red sensors.

DESCRIPTION OF THE DRAWINGS

For fuller understanding of the present invention, reference is made to the accompanying drawing in the following detailed Description of the Preferred Embodiment of the invention. In the drawing.

Figure 1A:
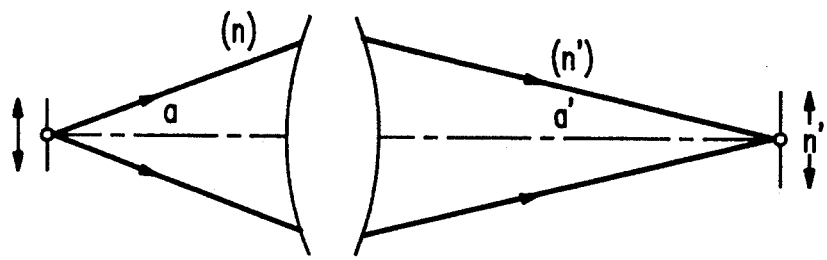
FIG. 1A is a cross-sectional view of the ray tracing of the Lagrange invariant in classical optics according to the prior art.
Figure 1B:
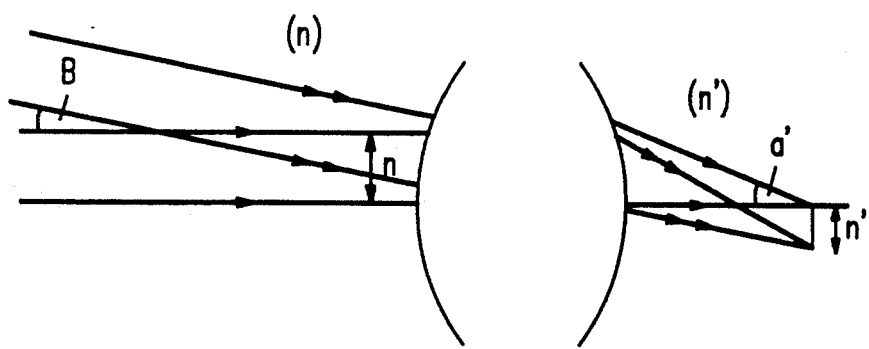
FIG. 1B is the Lagrange invariant of FIG. 1A having one infinite conjugate.
Figure 1C:
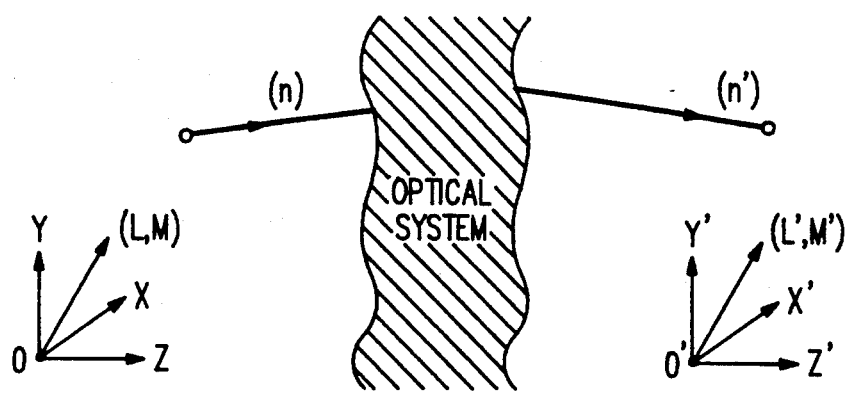
FIG. 1C is a diagram of the notation for the generalized Lagrange invariant for classical geometrical optics according to the prior art.
Figure 1D:
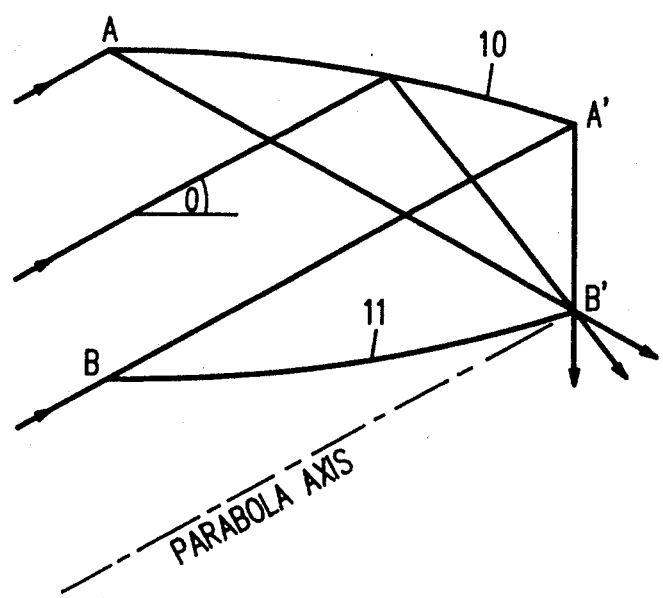
FIG. 1D is a cross-sectional view of a compound parabolic concentrator according to the prior art.

Reference numbers refer to the same or equivalent parts of the present invention throughout the several figures of the drawing.

BEST MODE OF CARRYING OUT THE INVENTION

A system for concentrating and projecting electromagnetic radiation constructed according to the principles of the present invention comprises a compact, non-imaging reflecting system which utilizes re-entrant geometries and multiple internal reflections to achieve concentration of electromagnetic radiation onto an extended receiver or to project a specified spatial radiation distribution from an extended radiating source. The concentrating system of the present invention comprises a generally-shaped, primary reflecting surface which may be used with one or more generally-shaped, secondary reflecting surfaces.

Figure 2B:
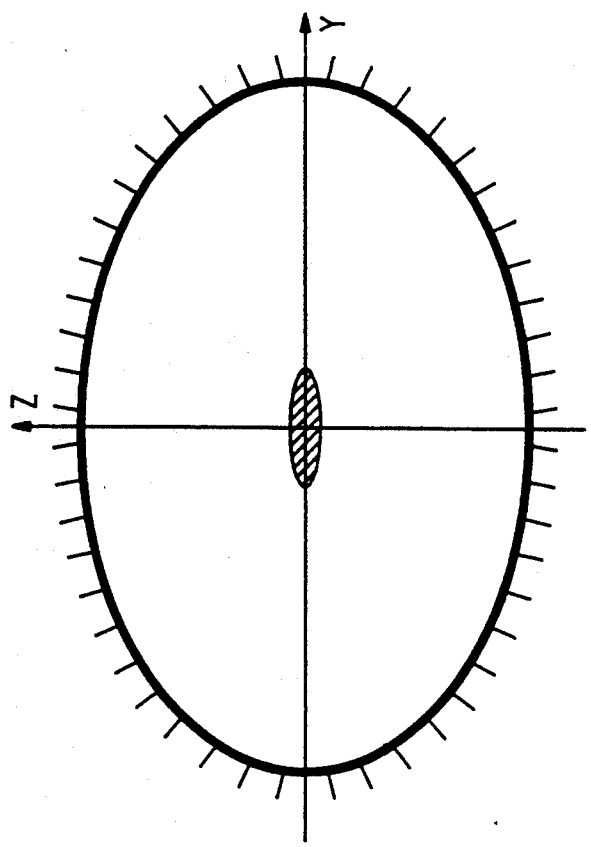
FIG. 2B is a frontal view of one embodiment of the concentrating system of FIG. 2.
Figure 2A:
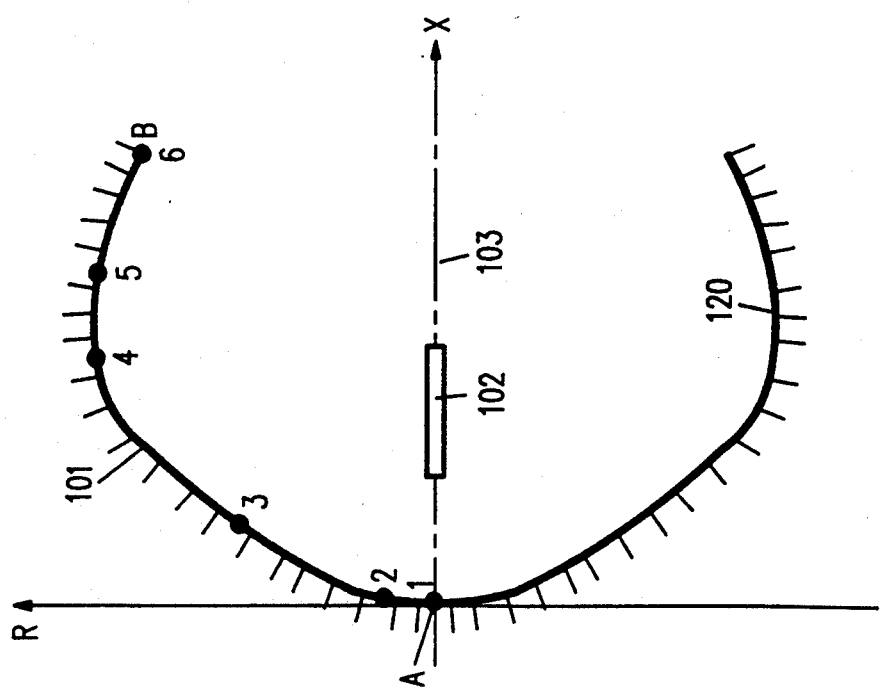
FIG. 2A is a cross-sectional view of the geometry of the primary reflecting surface of the concentrating system of FIG. 2 in the R-X plane.

Referring to FIG. 2A, concentrator 101 is utilized with radiating source 102 located along optical axis 103. Concentrator 101 also represents a concentrator for an extended receiver, likewise, located along optical axis 103. Reflecting surface 120 comprises a coating of suitable high-efficiency reflective material, such as gold, applied to the inside surface of concentrator 101.

As discussed in the section of this specification entitled "BACKGROUND ART", the prior art in nonimaging optics has recognized that the release of the imaging constraints (i.e. permitting a non-imaging system) can result in improved performance. The prior art advocates release of constraint (b) which results in systems that violate the Sine condition and possess greatly aberrated images to the point where they are considered non-images. Prior art, however, teaches to design systems (such as a CPC) by limiting designs to single reflections (although, inadvertently, multiple reflections do occur in these systems to some extent); this implies maintaining the existence of $\Gamma$ as a transformation although now, a many-to-one relationship is permitted in (a) and $\Gamma$ is no longer a homeomorphism.

This invention extends the prior art by teaching away from the single reflection concept. By intentionally designing for multiple reflections a complete release of constraint (a) is achieved. The optical system now possesses a multitude of transformations which results in a relationship of many-to-many between the object space and the image space. This further extends the solution space which means that designs previously forbidden can be explored and therefore better performing designs can be discovered.

In operation, exit aperture A-C of the present invention acts as a shared aperture for rays emanating from different sections of source 102, as well as for rays emanating at different angles from the same sections of source 102. Fundamentally, intensity and radiance are increased by two mechanisms—namely—1) compression of solid angle of emitted radiation, and 2) source re-energizing. Examples of these mechanisms are described with continuing reference to FIG. 3 elsewhere in this specification.

The shape of reflecting surface 120 of concentrator 101 is determined generally, depending on the nature of radiating source 102 and the desired concentration pattern. The geometry for constructing the reflector/projector of the present invention is determined by employing a Cartesian X, Y, Z coordinate system as shown in FIGS. 2A and 2B. In FIG. 2A, a cross-section of the geometry of the primary reflecting surface shown in the R-X plane. FIG. 2B, likewise, depicts the geometry in the Z-Y plane.

The determination of the three-dimensional shape is as follows: A cubic spline function $$F(R,X)=0 \qquad (9)$$

is uniquely determined by the positions of six knots numbered 1 to 6 in FIG. 2A, while specifying the slope at knot number 1 as $\pi/2$ and determining the slope at knot number 6 by passing a second order polynomial through knots 4, 5, 6.

Referring again to FIG. 2B, a function describing an ellipse $$Z^2/a^2 + Y^2/b^2 = 1 \qquad (10)$$

where $$a^2 + b^2 = R^2 \qquad (11)$$

and $$a/b = K \text{(a constant)} \qquad (12)$$

is uniquely determined by specifying the dimensions of its major and minor axes (a) and (b).

Figure 2C:
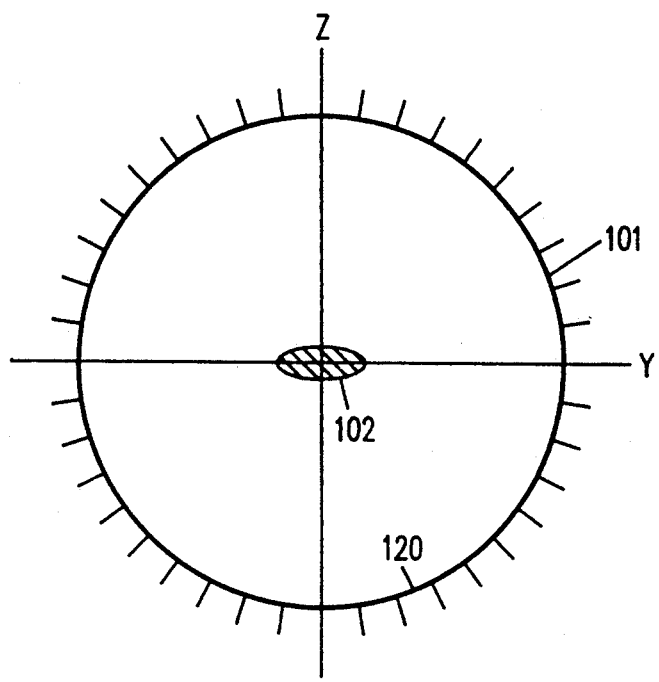
FIG. 2C is a frontal view of another embodiment of the concentrating system of FIG. 2.

With continuing reference to FIGS. 2A and 2B, for any given value of coordinate position X, a value for R can be determined by solving equation (9), from which (a) and (b) can be determined by solving equations (11)

and (12). The cross-sectional geometry can then be determined by specifying a series of values for coordinate Y and solving for Z in equation (10). It is readily apparent that R and Z become identical for the special case of a circular cross-section in which reflecting surface 120 is constructed by rotating line segment A-B about axis 103 to form a volume of revolution as shown in FIG. 2C.

Figure 2D:
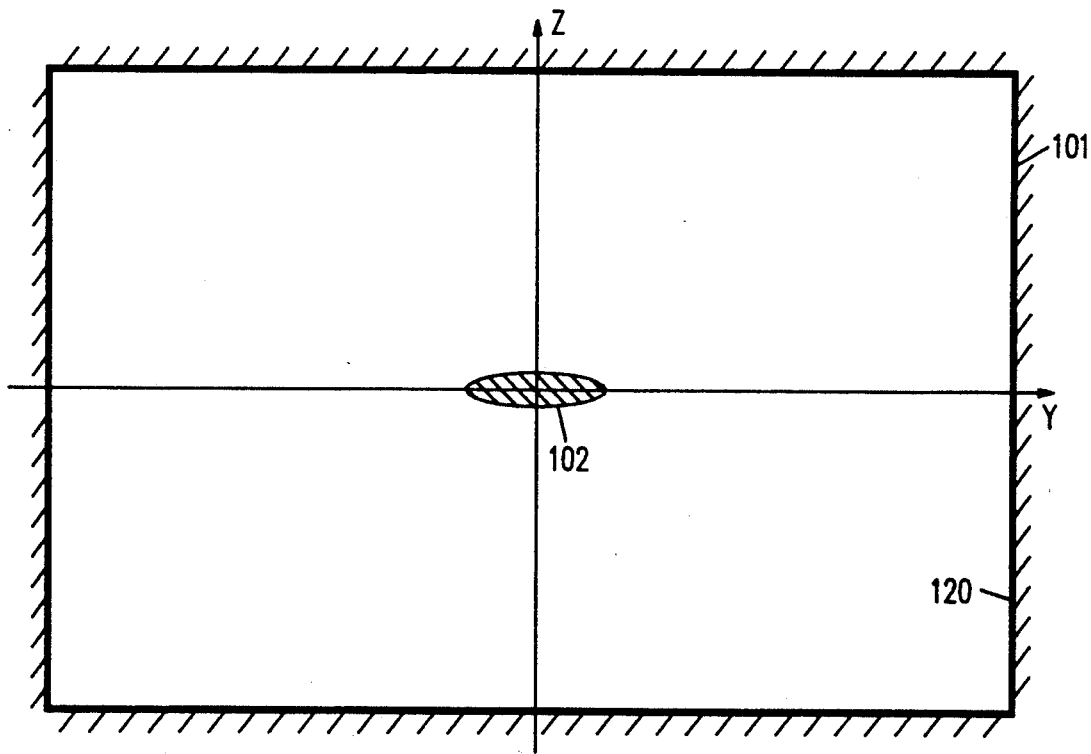
FIG. 2D is a frontal view of another embodiment of the concentrating system of FIG. 2.

Equation (10) can take many other forms, providing for many other cross-sectional shapes. Another example of a non-circular cross-section is given in FIG. 2D. This cross-section, coupled with the spline function, results in a trough-like configuration. In this case, Z is equivalent to R and is constant for all values of Y. The side walls of the reflecting surface i.e., lines of constant Y, then simply become flat plates.

The function R-X is uniquely determined, for the example in FIG. 2A, by the following knot positions:

TABLE I

| Knot No. | X | R |
| --- | --- | --- |
| 1 | 0. | 0. |
| 2 | 0.0647 | 0.3027 |
| 3 | 0.2104 | 0.5714 |
| 4 | 0.5502 | 1. |
| 5 | 1.0587 | 0.9889 |
| 6 | 1.3110 | 0.8865 |

All the values in Table I have been normalized by the maximum value for R at knot 4.

The present invention operates as both a concentrator and projector. Thus, if source 102 is an extended receiver, reflecting surface 120 of concentrator 101 concentrates radiation received from a source at (not shown). Conversely, if source 102 is radiating electromagnetic radiation, then reflecting surface 120 projects the radiation to infinity or intermediate receiver as required. Even allowing for reflective losses, the overall radiation throughput of this system provides enhanced concentration or projection of electromagnetic radiation.

Figure 3:
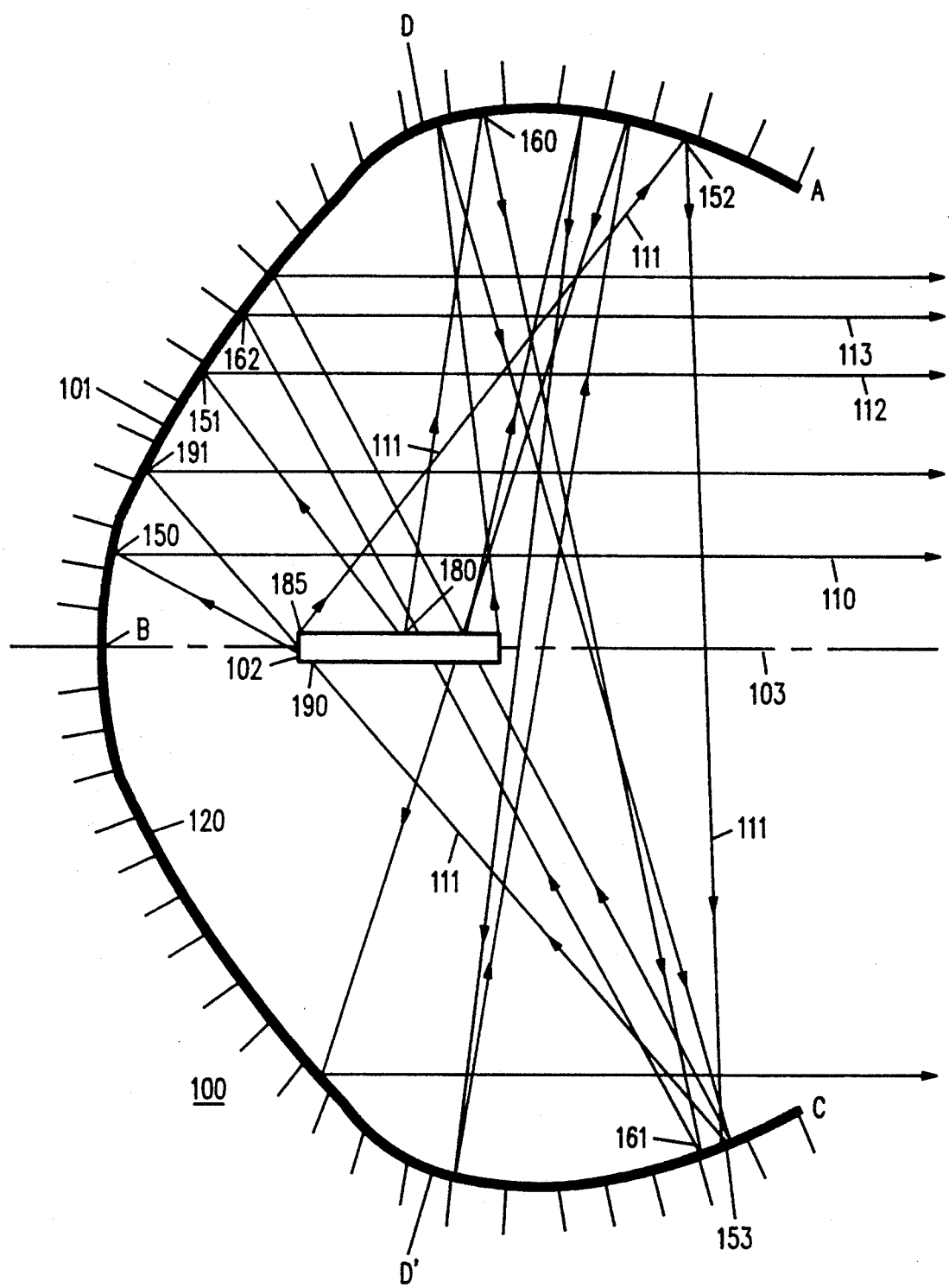
FIG. 3 is a cross-sectional view of an electromagnetic radiation concentrating system constructed to the principles of the present invention.

Referring now to FIG. 3, some of the rays emanating from source 102 are directed toward aperture A-C after a single reflection. Thus, for example, ray 110 exits aperture A-C after a single reflection at point 150. Similarly, ray 112 exits the aperture after a single reflection at point 151.

With continuing reference to FIG. 3, the path of ray 113 emanating from point 180 of radiating source 102 illustrates the multiple-reflection mechanism of the present invention. For purposes of this description, assume source 102 extends from point 180 to point 185 only. Thus, in this example, ray 113 follows a multiple reflection path via reflection points 160, 161 and 162 to eventually exit aperture A-C in the desired direction. It should be noted that ray 113 does not re-enter source 102 (because source 102 does not extend to the right of point 180 in this example).

Compression of the solid angle of radiation emitted by the concentrator of the present invention is achieved by re-entrant geometry. All reflectors which possess an open aperture suffer loss of some radiation owing to radiation from the source directed into $2\pi$ steradians, i.e. rays that are never reflected from any point on reflecting surface 120. The re-entrant geometry of the present invention recovers some of that loss by decreasing the angle of rays able to freely emanate from source 102 without any reflection whatsoever.

For the configuration of FIG. 3, the re-entrant geometry of primary reflecting surface 120 begins generally at points of inflection D and D', and extends to aperture A-C. Such geometry causes multiple reflection of rays of electromagnetic radiation within the envelope of reflecting surface 120. Some rays re-enter source 102 and many others do not, depending on the 3D shape of reflecting surface 120.

Ray 111, as shown in FIG. 3, is an example of a ray which re-enters source 102 after a multiple reflection process. Emanating from source 102 at point 180, ray 111 is reflected at reflection points 152 and 153 to re-enter source 102 at point 190. After re-entering source 102, the energy transported by ray 111 is redistributed and contributes to the energy of all of the other rays leaving source 102, and therefore all rays leaving aperture A-C.

Figure 4:
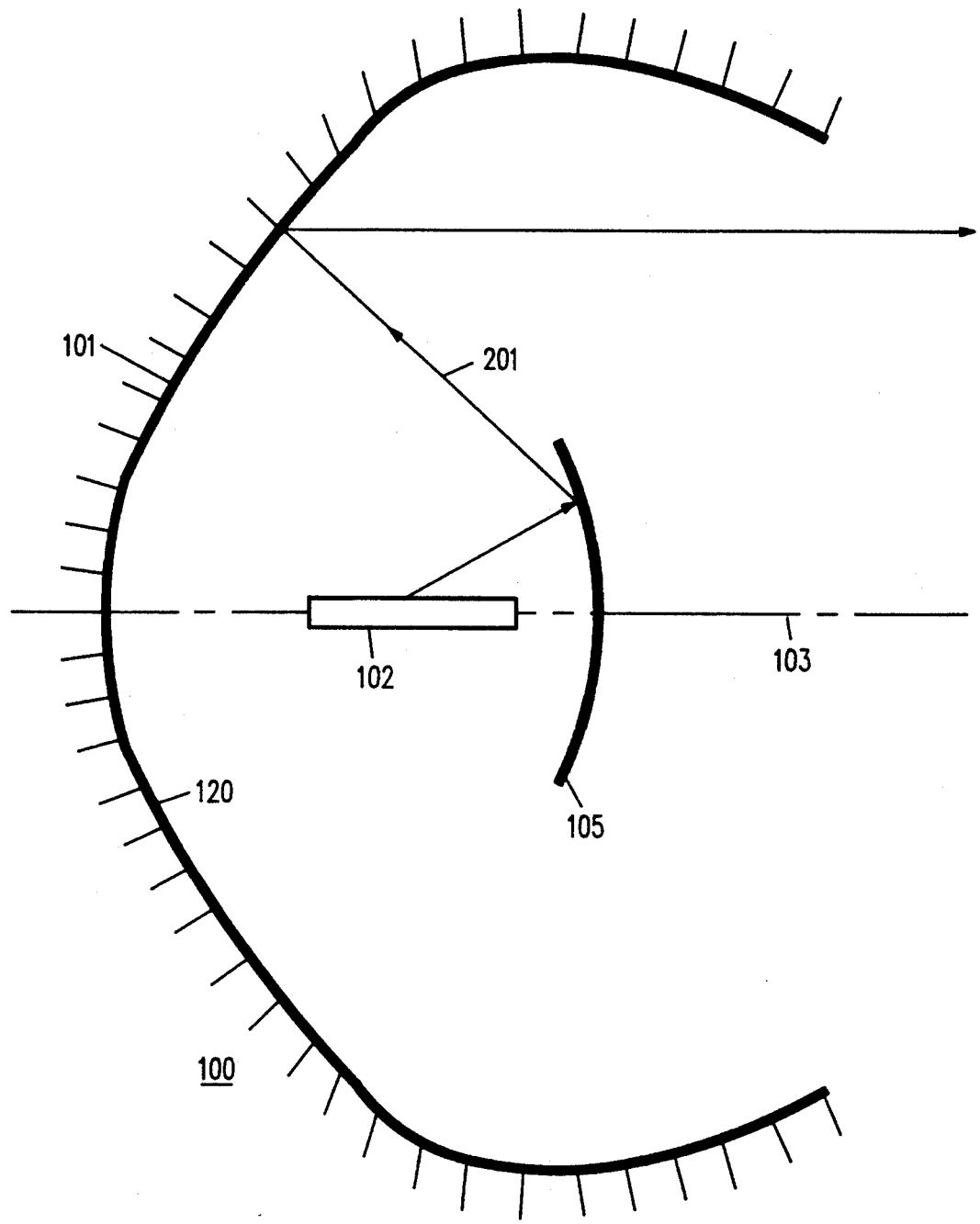
FIG. 4 is a cross-sectional view of a second embodiment of the concentrating system according to FIG. 2.

Referring now to FIG. 4, a second embodiment of the present invention includes a secondary reflecting surface 105, disposed coaxially with the primary reflecting surface 120 along axis 103. The secondary reflecting surface 105 captures and reuses some of the radiation emanating from the extended radiating source 102 that would otherwise freely radiate into unwanted directions. Thus, ray 201 is multiply reflected at points 250 and 251. Please note, secondary reflecting surface 105 may also be used in reverse to achieve concentration of incoming radiation on to an extended receiver.

Secondary reflecting surface 105 comprises a concave mirror. It should be noted that secondary reflecting surface 105 can take shapes other than concave. The shape and size of secondary reflecting surface 105 is also determined by the nature of radiating source 102 and the desired concentration pattern. The specific geometry of reflecting surface 105 is determined in the same way as described for primary reflecting surface 120. It should be noted that both sides of reflecting surface of 105 are reflective.

Figure 5:
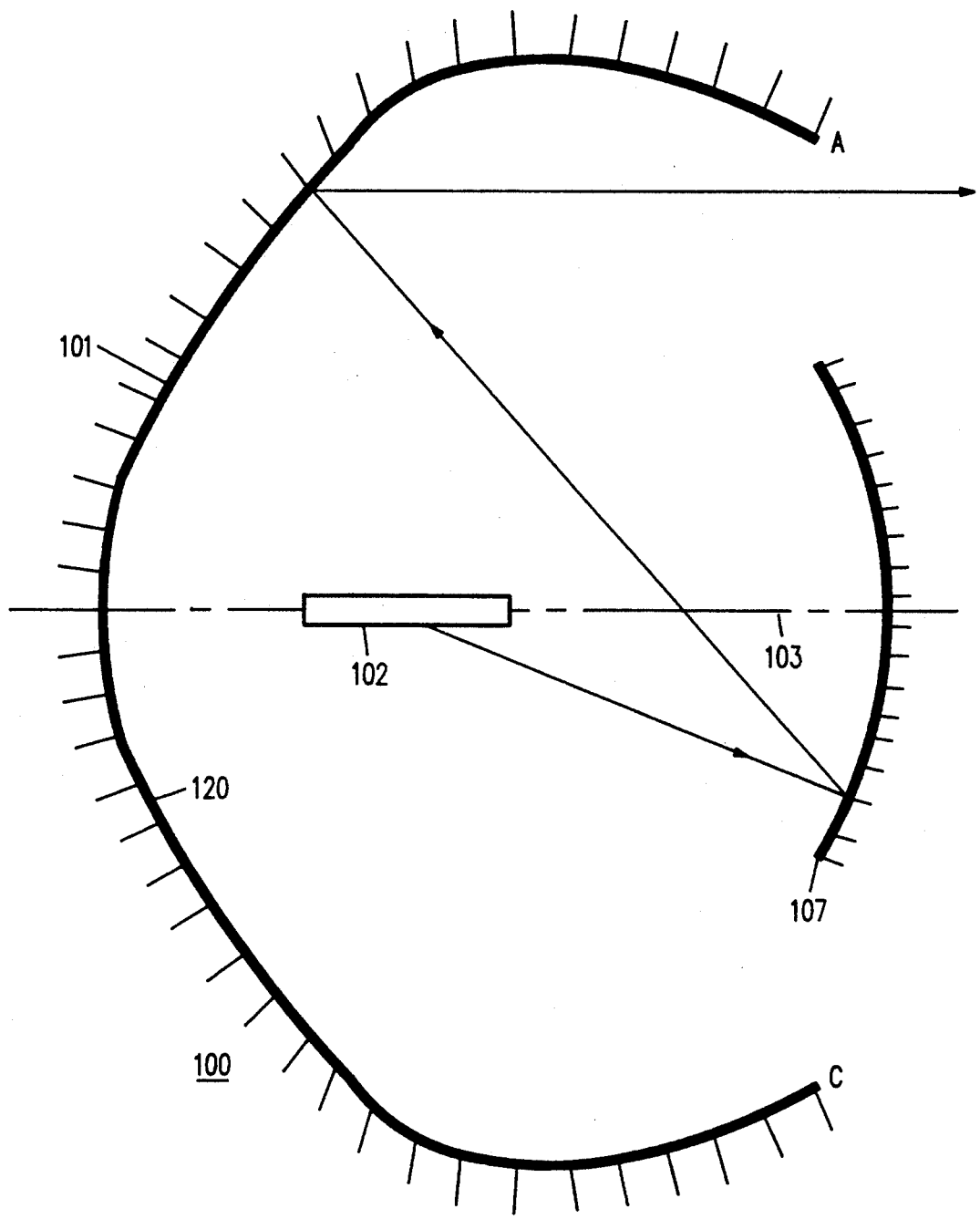
FIG. 5 is a cross-sectional view of a third embodiment of the concentrating system of FIG. 2.

In FIG. 5, secondary reflecting surface 107 is disposed outside of the envelope of the primary reflecting surface 120, at or near aperture A-C. Secondary reflecting surface 107 also captures and reuses some of the radiation emanating from the extended source 102 that would otherwise radiate into unwanted directions. Again, as with the secondary reflecting surface 105 of FIG. 3, secondary reflecting surface 107 also represents the use of a secondary reflecting surface to achieve concentration of incoming radiation onto a coaxially located extended receiver.

The shape, size and location of secondary reflecting surface 107 is also determined by the nature of radiating source 102 and the desired concentration pattern. For the configuration of FIG. 5, secondary reflecting surface 107 also comprises a generally concave shape as determined in the same way as described for primary reflecting surface 120. As with reflecting surface 105, reflecting surface 107 can take shapes other than concave. Reflecting surface 107 is reflective only on the side which faces aperture A-C.

Figure 6:
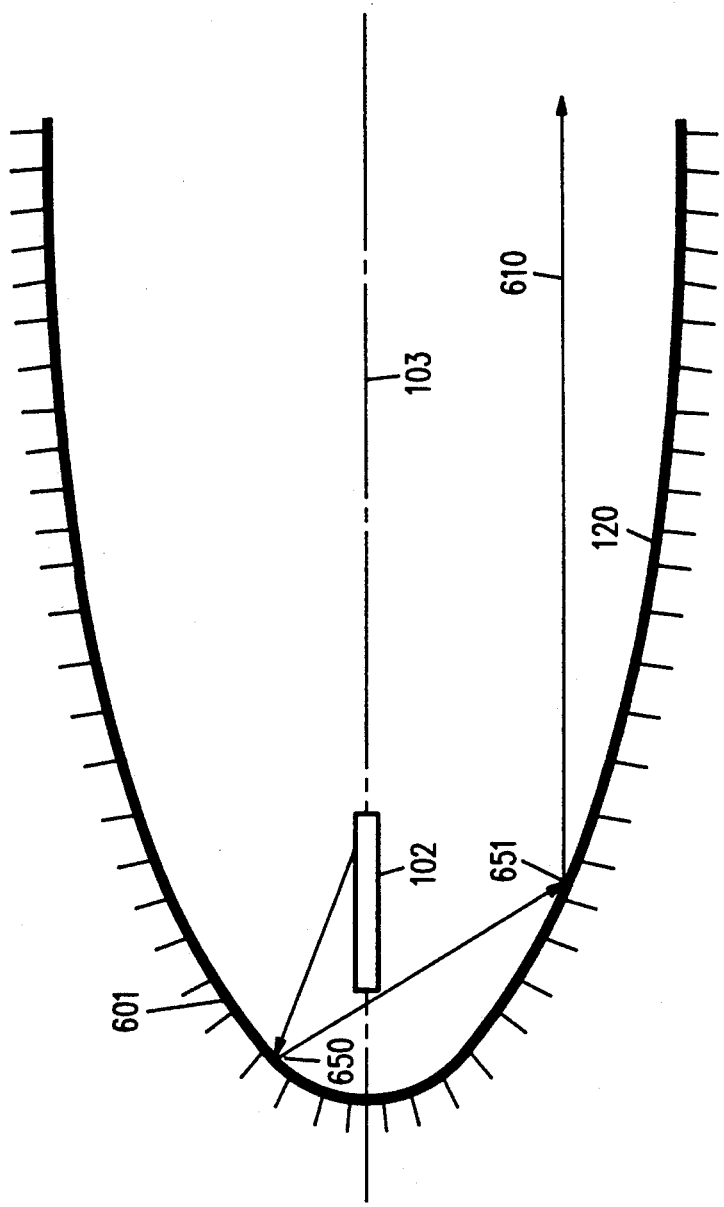
FIG. 6 is a cross-sectional view of another embodiment of the electromagnetic radiation concentrating system of FIG. 3.

It should be noted that the shape of a primary reflecting surface, designed according to the principles of the present invention, is based on achieving a desired concentration of light derived from singly and multiply reflected radiation. Moreover, such a design need not rely on re-entrant reflecting surfaces. Thus, in FIG. 6, non-reentrant reflector geometry 601 includes optical axis 103 and reflecting surface 120. In this configuration, ray 610, emanating from source 102, is multiply reflected at points 650 and 651.

The present invention has been particularly shown and described with respect to certain preferred embodiments of features thereof. However, it should be readily apparent to those of ordinary skill in the art that various changes and modifications in form and details may be made without departing from the spirit and scope of the invention as set forth in the appended claims.

We claim:

1. A system for concentrating and projecting non-imaged electromagnetic radiation from a source of electromagnetic radiation onto a receiver of electromagnetic radiation, respectively, said system comprising:

primary reflecting means having an aperture for receiving electromagnetic radiation from said source, said primary reflecting means selectably projecting electromagnetic radiation onto said receiver;

said primary reflecting means having reflecting surfaces for singly and multiply reflecting rays of electromagnetic radiation and having re-entrant reflecting surfaces for multiply-reflecting rays of electromagnetic radiation emanating from said source.

2. A system as in claim 1 wherein said aperture is non-circular.

3. A system as in claim 2 wherein said aperture is substantially elliptical.

4. A system as in claim 2 wherein said aperture is substantially rectangular.

5. A system as in claim 1 wherein said aperture is substantially circular.

6. A system as in claim 1 further including secondary reflecting means disposed generally within said primary reflecting means and between said source and said aperture thereof for reflecting rays of electromagnetic radiation emanating from said source and from said primary reflecting means.

7. A system as in claim 6 wherein said secondary reflecting means includes both concave and convex reflecting surfaces.

8. A system as in claim 6 wherein said secondary reflecting means is disposed outside said primary reflecting means and near said aperture thereof for reflecting rays of electromagnetic radiation emanating from said primary reflecting means.

9. A system as in claim 8 wherein said secondary reflecting means reflects rays of electromagnetic radiation emanating from said source when said source is disposed within said primary reflecting means.

10. A system as in claim 8 or 9 wherein said secondary reflecting means has a concave reflecting surface.

11. A system as in claim 1 wherein the shape of said primary reflecting means is generally concave and is determined by the solution of simultaneous equations for describing the aperture thereof in a first plane and for describing the profile thereof in a second plane orthogonal to said first plane.

12. A system as in claim 11 wherein said equation for describing said aperture is a non-circular function and said equation for describing said profile is a cubic spline function uniquely determined by a plurality of knots.

13. A system as in claim 12 wherein said equation for describing said aperture is an ellipse.

14. A system as in claim 12 wherein said equation for describing said aperture is a rectangle.

15. A system as in claim 12 wherein said equation for describing said aperture is a circular function.

16. A system for concentrating and projecting non-imaged electromagnetic radiation from a source of electromagnetic radiation onto a receiver of electromagnetic radiation, respectively, said system comprising:

primary reflecting means having an aperture for receiving electromagnetic radiation from said source, said primary reflecting means selectably projecting electromagnetic radiation onto said receiver;

said primary reflecting means having reflecting surfaces for compressing the solid angle of electromagnetic radiation reflected therefrom, the shape of said reflecting surfaces being based upon achieving a desired concentration of electromagnetic radiation derived from singly and multiply reflected rays.

17. A system as in claim 16 wherein said primary reflecting means includes re-entrant reflecting surfaces for multiply-reflecting rays of electromagnetic radiation emanating from said source.

18. A system as in claim 17 further including secondary reflecting means disposed generally within said primary reflecting means and between said source and said aperture thereof for reflecting rays of electromagnetic radiation emanating from said source and from said primary reflecting means.

19. A system as in claim 18 wherein said secondary reflecting means includes both concave and convex reflecting surfaces.

20. A system as in claim 18 wherein said secondary reflecting means is disposed outside said primary reflecting means and near said aperture thereof for reflecting rays of electromagnetic radiation emanating from said primary reflecting means.

21. A system as in claim 20 wherein said secondary reflecting means reflects rays of electromagnetic radiation emanating from said source when said source is disposed within said primary reflecting means.

22. A system as in claims 1 or 17 wherein said re-entrant reflecting surfaces reflect electromagnetic energy into said source for redistribution therein before said energy is projected onto said receiver.

23. A method for concentrating and projecting non-imaged electromagnetic radiation from a source of electromagnetic radiation onto a receiver of electromagnetic radiation, respectively, said method comprising the steps of:

forming primary reflecting means having an aperture for receiving electromagnetic radiation from said source;

projecting electromagnetic radiation onto said receiver by single and multiple reflections of electromagnetic radiation; and forming re-entrant reflecting surfaces for multiply-reflecting electromagnetic radiation emanating from said source.

24. A method as in claim 23 wherein said aperture is non-circular.

25. A method as in claim 24 wherein said aperture is substantially elliptical.

26. A method as in claim 24 wherein said aperture is substantially rectangular.

27. A method as in claim 23 wherein said aperture is substantially circular.

28. A method as in claim 23 further including the steps of:

forming secondary reflecting means disposed generally within said primary reflecting means and between said source and said aperture thereof; and reflecting electromagnetic radiation emanating from said source and from said primary reflecting means from said secondary reflecting means.

29. A method as in claim 28 wherein said secondary reflecting means includes both concave and convex reflecting surfaces.

30. A method as in claim 28 wherein said secondary reflecting means is disposed outside said primary reflecting means and near said aperture thereof for reflecting electromagnetic radiation emanating from said primary reflecting means.

31. A method as in claim 30 wherein said secondary reflecting means reflects electromagnetic radiation emanating from said source when said source is disposed within said primary reflecting means.

32. A method as in claim 30 or 31 wherein said secondary reflecting means has a concave reflecting surface.

33. A method as in claim 23 wherein the step of forming said primary reflecting means includes the step of forming said primary reflecting means into a generally concave shape according to the solution of simultaneous equations for describing the aperture thereof in a first plane and for describing the profile thereof in a second plane orthogonal to said first plane.

34. A method as in claim 33 wherein said equation for describing said aperture is a non-circular function and said equation for describing said profile is a cubic spline function uniquely determined by a plurality of knots.

35. A method as in claim 34 wherein said equation for describing said aperture is an ellipse.

36. A method as in claim 34 wherein said equation for describing said aperture is a rectangle.

37. A method as in claim 34 wherein said equation for describing said aperture is a circular function.

38. A method for concentrating and projecting non-imaged electromagnetic radiation from a source of electromagnetic radiation onto a receiver of electromagnetic radiation, respectively, said method comprising the steps of:

forming primary reflecting means having an aperture for receiving electromagnetic radiation from said source;

projecting electromagnetic radiation onto said receiver by single and multiple reflections of electromagnetic radiation; and forming first reflecting surfaces in said primary reflecting means for compressing the solid angle of electromagnetic radiation reflected therefrom, the shape of said reflecting surfaces being based upon achieving a desired concentration of electromagnetic radiation derived from single and multiple reflections thereof.

39. A method as in claim 38 wherein said primary reflecting means includes reentrant reflecting surfaces for multiply-reflecting electromagnetic radiation emanating from said source.

40. A method as in claims 23 or 38 further including the step of reflecting electromagnetic energy into said source for redistribution therein before said energy is projected onto said receiver.

* * * * *